J. M. LUNZ.
THRASHER.
APPLICATION FILED OCT. 19, 1921.
1,428,599.
Patented Sept. 12, 1922.
3 SHEETS—SHEET 3.
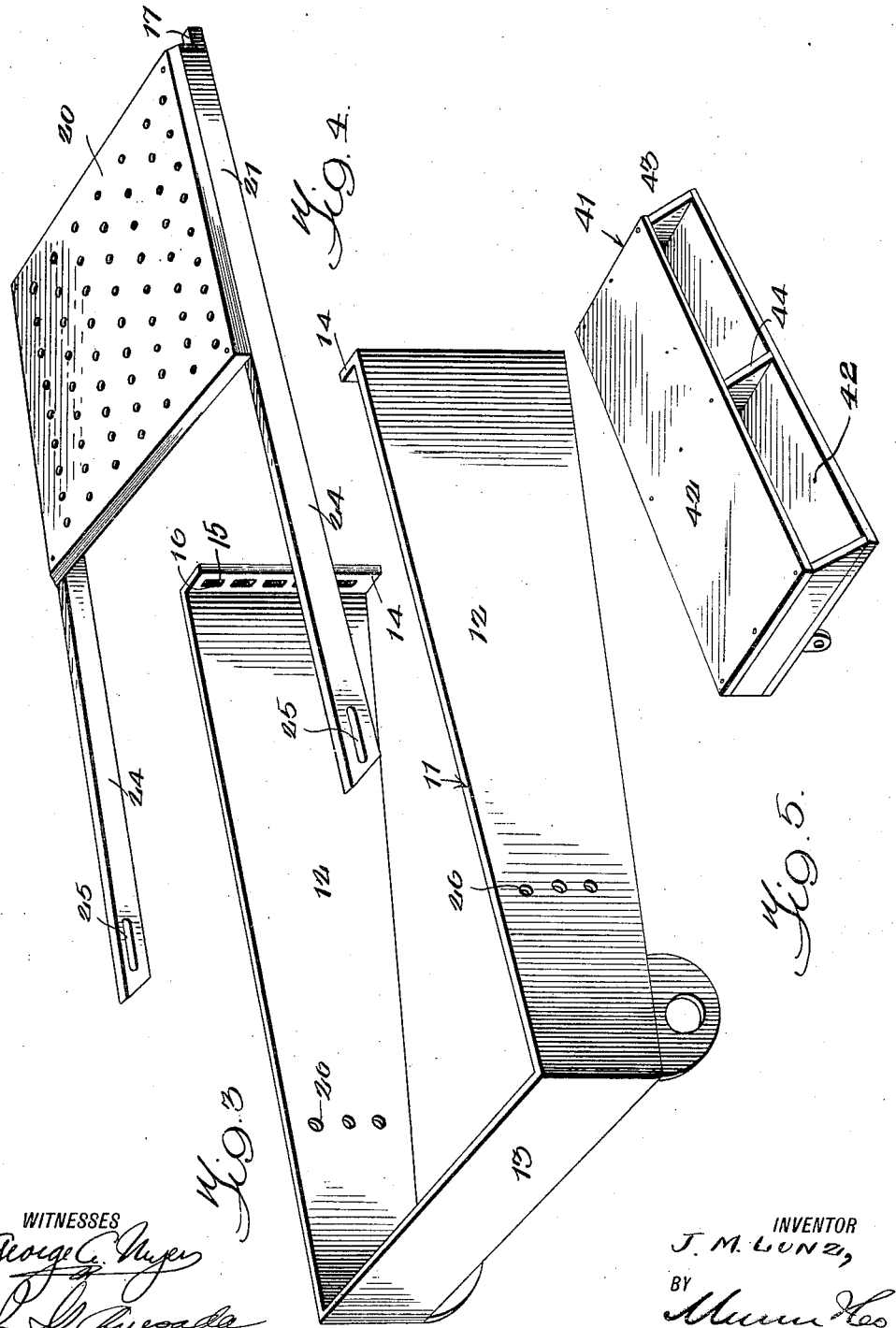
WITNESSES
INVENTOR
J. M. Lunz,
BY
ATTORNEYS Patented Sept. 12, 1922.

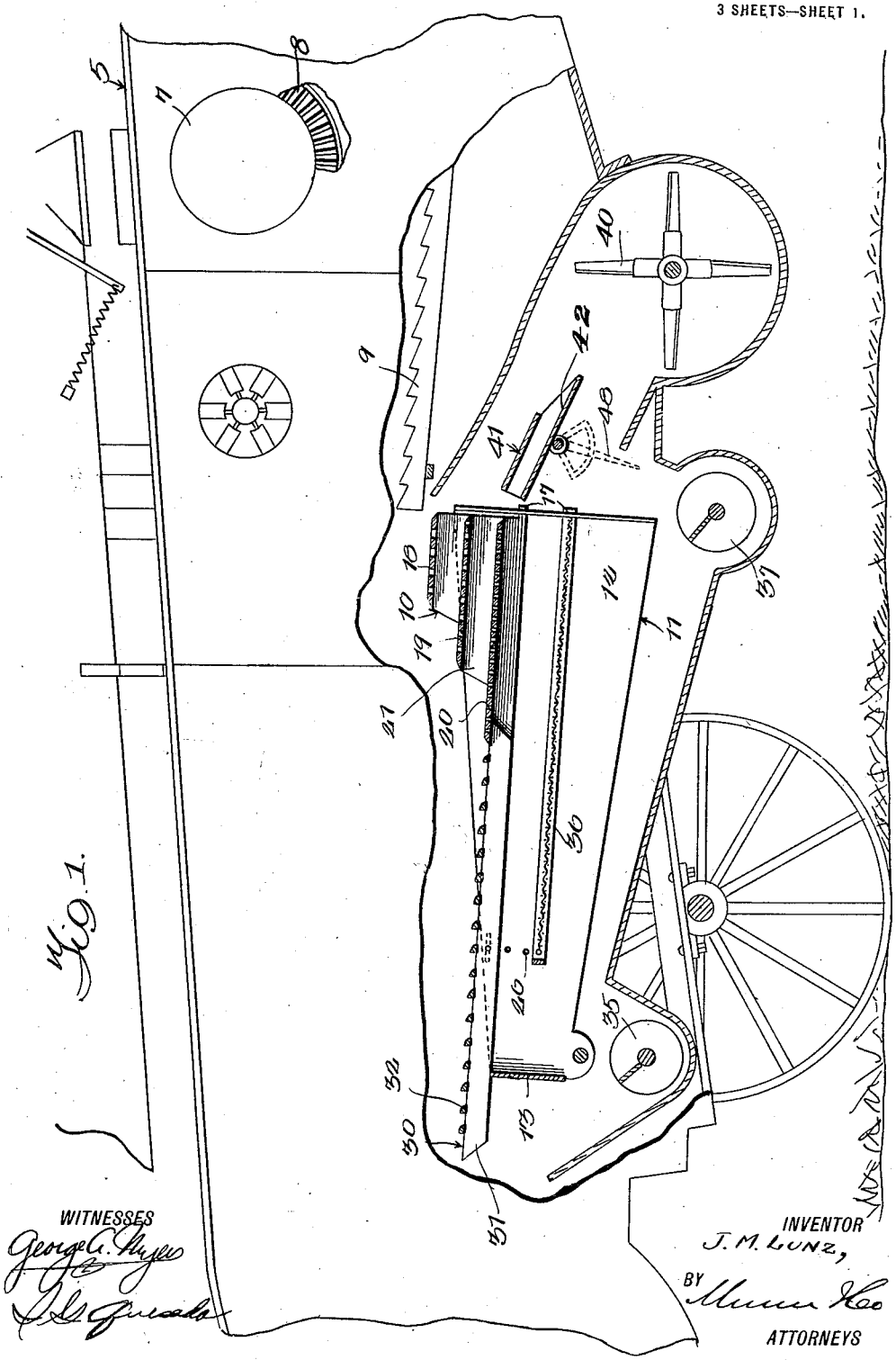

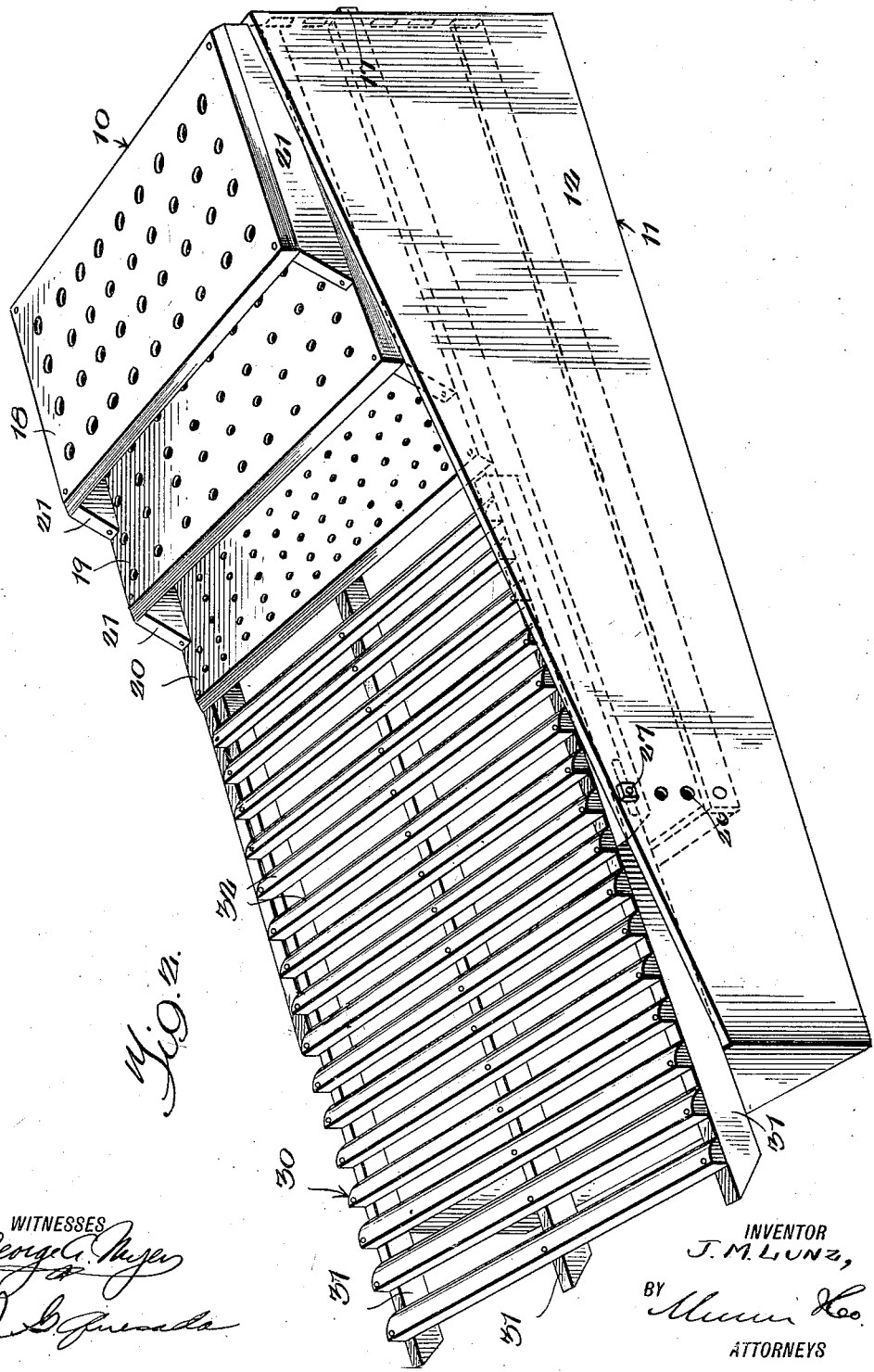

1,428,599

UNITED STATES PATENT OFFICE.

JOE M. LUNZ, OF WRIGHT, KANSAS.

THRASHER.

Application filed October 19, 1921. Serial No. 508,775.

*To all whom it may concern:*

Be it known that I, JOE M. LUNZ, a citizen of the United States, and resident of Wright, in the county of Ford and State of Kansas, have invented certain new and useful Improvements in Thrashers, of which the following is a specification.

This invention relates to thrashers and more particularly to the grain separating means therefor.

An important object is to provide a grain separator for thrashing machines having novel means whereby the same will thoroughly separate the grain from the chaff and the tailings so that the necessity of returning the grain to the cylindrical beater and concave is dispensed with.

A further object of the invention is to provide a thrashing machine having novel means whereby the blast of air through the separator may be regulated for operating under a variety of conditions.

Other objects and advantages of the invention will be apparent during the course of the following description.

In the accompanying drawings forming a part of this application and in which like numerals are employed to designate like parts throughout the same, Figure 1 is a detail view of a thrashing machine equipped with the improved separator and wind board.

Figure 2 is a perspective of the improved separator applied to the shoe of the thrashing machine.

Figure 3 is a perspective of a shoe of a thrashing machine.

Figure 4 is a perspective of a separating member embodied in the invention.

Figure 5 is a perspective of a wind board embodied in the invention.

In the drawing wherein for the purpose of illustration is shown a preferred embodiment of the invention the numeral 5 generally designates a thrashing machine especially adapted for thrashing grain such for instance as barley, rye, alfalfa or other small grain. The thrasher is of the conventional type and is provided with the usual cylindrical beater 7 beneath which concave 8 is arranged, the said cylinder 7 and the concave 8 being adapted to remove the grain for subsequent separation from the chaff, the tailings and the like. Upon being discharged from the concave 8, the grain and the tailings drop onto a grain board 9 and from the grain board 9 drop onto the separator generally designated by the numeral 10 and which forms the subject matter of this invention. The separator 10 is mounted upon the U-shaped shoe 11 having the usual spaced parallel sides 12 and a transversely extending connecting portion 13. As illustrated in Figure 3 in particular the spaced sides 12 of the U-shaped shoe 11 are provided at their ends with inwardly directed flanges 14 having notches 15 to receive attaching lugs 17 of a series of stub chaffers 18, 19 and 20. The stub chaffers 18, 19 and 20 are arranged in superposed relation and are spaced by depending sides 21, the said depending sides 21 being provided with the lugs 17 which fit into the notches 16 of the flanges 14. It is thus seen that the ends of the stud chaffers 18, 19 and 20 may be adjustably connected to the inwardly directed shoes 14. The lower stub chaffer 20 has its depending side 21 extended forwardly to provide arms 24 having longitudinal slots 25 adapted for registration with openings 26. The arms 24 of which there are two may be adjustably secured to the sides 12 of the shoe 11 by means of bolts 27 which may be extended through the slots 25 and the proper opening 26. It is thus seen that the inclination of the stub chaffers 18, 19 and 20 may be varied to meet the requirements of the grain being thrashed.

As more particularly illustrated in Figure 2 a tailings chaffer 30 of elongated formation is mounted upon the shoe in advance of the stub chaffers and consists of a plurality of spaced parallel beams 31 to which spaced parallel quarter round strips 32 are connected. The short tailings of wheat which do not pass through the stub chaffers are conducted along the tailing chaffer 31 and are conveyed by the elevator 35 to the cylinder 7 and the concave 8.

The grain upon passing through the stub chaffers 18, 19 and 20 drops upon a sieve 36 and upon passing through the seive is conducted out of the machine by means of a conveyor 37. It will be observed that the bolts 27 provide a means whereby the tailings chaffer 30 may be readily and conveniently adjusted. Also the pitch of the same may be varied. In the use of the device the forwardly extending arm 24 may be readily and conveniently adjusted by means of the bolts 27.

The chaff and the other like matter is introduced into the stacker by means of a blower 40 arranged rearwardly of a double wind board generally designated by the numeral 41 and illustrated in detail in Figure 5. As illustrated in Figure 5 the double wind board 41 consists of upper and lower boards 42 connected by end walls 43 and an intermediate guide wall 44.

In operation the wind board 41 may be adjusted to any desired angle by means of a handle 48 so that the blast of air from the fan or blower 40 may be controlled. The lower board of the wind board is somewhat wider than the upper board and the center board 44 acts as a means to direct the air straight through the wind board in case of a side draft. Also by this manner of air control the entire surface of the separator is utilized.

By the use of the improved separator all of the grain is separated on its first movement through the thrashing machine and nothing but stems, white caps and small particles which are not blown out through the chaffer by the air are returned to the cylinder to be thrashed again. However the grain moves down through the sieve and is carried off by means of the conveyor 37. By reason of this construction the operator may adjust the concave up close to the cylinder thereby insuring the removal of all the grain from the straw.

Having thus described my invention what I claim is:—

1. In a thrashing machine, the combination with a shoe having inwardly directed terminal portions of a plurality of stub chaffers having lugs adjustably connected to said inwardly directed portions and a tailing chaffer connected to said shoe.

2. In a thrashing machine, the combination with a U-shaped shoe having inwardly directed terminal portions, of a plurality of stub chaffers having lugs adjustably connected to said inwardly extending portions, and a tailing chaffer connected to said shoe.

3. In a thrashing machine, the combination with a U-shaped shoe having inwardly directed terminal portions, of a plurality of stub chaffers having lugs adjustably connected to said inwardly extending portions, a tailing chaffer connected to said shoe, and a sieve arranged beneath said stub and tailing chaffers.

4. In a thrashing machine, the combination with a U-shaped shoe having inwardly directed terminal portions, of a plurality of stub chaffers having lugs adjustably connected to said inwardly extending portions, a tailing chaffer connected to said shoe, a sieve arranged beneath said stub and tailing chaffers, and a wind board for directing a blast of air to said stub chaffers.

5. In a thrashing machine, the combination with a U-shaped shoe having spaced sides and inwardly directed flanges provided with notches, a plurality of superposed stub chaffers mounted upon said shoe and having depending sides provided with lugs adjustably received within said notches whereby to adjustably connect the stub chaffers to the shoe, certain of said depending sides being provided with extensions constituting arms, said arms being provided with slots, and means extending through said slots and spaced sides of said shoe to adjustably connect the arms to said spaced sides.

6. In a thrashing machine, the combination with a U-shaped shoe having spaced sides and inwardly directed flanges provided with notches, a plurality of superposed stub chaffers mounted upon said shoe and having depending sides provided with lugs adjustably received within said notches whereby to adjustably connect the stub chaffers to the shoe, certain of said depending sides being provided with extensions constituting arms, said arms being provided with slots, means extending through said slots and spaced sides of said shoe to adjustably connect the arms to said spaced sides, and a tailing chaffer connected to said spaced sides.

7. In a thrashing machine, the combination with a U-shaped shoe having spaced sides and inwardly directed flanges provided with notches, a plurality of superposed stub chaffers mounted upon said shoe and having depending sides provided with lugs adjustably received within said notches whereby to adjustably connect the stub chaffers to the shoe, certain of said depending sides being provided with extensions constituting arms, said arms being provided with slots, means extending through said slots and spaced sides of said shoe to adjustably connect the arms to said spaced sides, a tailing chaffer connected to said spaced sides, and a sieve carried by said shoe beneath said chaffers.

JOE M. LUNZ.